United States Patent
Lau

(10) Patent No.: US 7,257,167 B2
(45) Date of Patent: Aug. 14, 2007

(54) SYSTEM AND METHOD FOR MULTI-ACCESS MIMO CHANNELS WITH FEEDBACK CAPACITY CONSTRAINT

(75) Inventor: Kin Nang Lau, Hong Kong (CN)

(73) Assignee: The University of Hong Kong (CN)

( * ) Notice: Subject to any disclaimer, the term of this patent is extended or adjusted under 35 U.S.C. 154(b) by 784 days.

(21) Appl. No.: 10/643,841

(22) Filed: Aug. 19, 2003

(65) Prior Publication Data

US 2005/0041750 A1    Feb. 24, 2005

(51) Int. Cl.
   *H04L 27/04* (2006.01)
(52) U.S. Cl. .................. 375/295; 342/368; 342/378; 367/138; 370/318; 370/342; 375/267; 375/299; 375/347; 455/101; 455/562.1
(58) Field of Classification Search ................ 375/295, 375/267; 342/17, 373, 374, 380, 368, 378; 370/321, 335, 342; 381/92
   See application file for complete search history.

(56) References Cited

OTHER PUBLICATIONS

Lau et al.; The Role of Transmit Diversity on Wireless Communications—Reverse Link Analysis With Partial Feedback, Dec. 2002, IEEE Transactions on Communications, pp. 2082-2090.*
Lau; Optimal Transmission Design For MIMO Block Fading Channels With Feedback Capacity Constraint, Apr. 2003, Information Theory Workshop, pp. 94-98.*

Barroso et al., "Blind Identification of MIMO Channels: A Closed Form Solution Based on Second Order Statistics", Instituto Superior Tecnico—Instituto de Sistemas e Robotica, Codex, Portugal (1999).
Tran et al., "A Generalized Simplified ML Decoder of Orthogonal Space—Time Block Code for Wireless Communications over Time-Selective Fading Channels", Dept. of Electrical and Computer Engineering, University of Calgary, Calgary, Canada, pp. 1911-1915 (2002).
K.N. Lau, "The Role of Transmit Diversity on Wireless Communications—Reverse Link Analysis with Partial Feedback", Bell Labs, Lucent Technologies, pp. 1-7 (Nov. 2001).
I. Emre Telatar, Capacity of Multi-antenna Gaussian Channels, Lucent Technologies, Bell Laboratories, Murray Hill, NJ, U.S.A., pp. 1-28.

* cited by examiner

*Primary Examiner*—David C. Payne
*Assistant Examiner*—Adolf DSouza
(74) *Attorney, Agent, or Firm*—Dickstein, Shapiro, LLP.

(57) ABSTRACT

Systems and methods of MIMO wireless communication system with partial feedback are disclosed. In one embodiment, a base station estimates the channel matrices of the K mobile units and transmits an index value corresponding to each of the estimated channel matrix. Each mobile unit selects a power control matrix and beam-forming matrix based on the received index value and transmits its data stream to the base station using the selected power control and beam-forming matrix. A method for generating the sets of power control matrices, beam-forming matrices, and partitions of the channel matrix space is disclosed.

19 Claims, 2 Drawing Sheets

US 7,257,167 B2

SYSTEM AND METHOD FOR MULTI-ACCESS MIMO CHANNELS WITH FEEDBACK CAPACITY CONSTRAINT

FIELD OF THE INVENTION

The present invention relates to wireless communication systems. More specifically, the invention relates to optimizing the resource allocations of multiple users in a Multiple-Input, Multiple-Output (MIMO) system under a feedback capacity constraint.

BACKGROUND OF THE INVENTION

The growing popularity of wireless communication for voice, data, and video applications has created a need for larger wireless capacity.

Current wireless communication systems are based on the Single-Input, Single-Output (SISO) channel where a single transmitter communicates with a single receiver over the channel. In one common arrangement, many mobile devices, such as cell phones, may be in communication with many base stations that are connected to a wired communication system. Either the mobile device or the base station selects a channel over which the mobile device and base station communicates. The selected channel is used exclusively by the specific mobile device and base station until the communication link is terminated by either device. No other device can use the channel while the communication link is established.

In some SISO systems, the selection of the channel is based on the strength of the signal received by the base station. By selecting the channel with the strongest signal, the bit rate of the communication is maximized. In one scenario, the several base stations may receive a signal from a particular mobile device and the base station with the strongest signal will establish a channel with the mobile device.

Multiple-Input, Multiple-Output (MIMO) systems, in contrast, are characterized by base stations and mobile devices having more than one antenna. In a typical situation, the transmitted data stream is demultiplexed into $n_T$ separate sub-streams. Each sub-stream is encoded into channel symbols and transmitted over one of the $n_T$ transmission antennas. The advantage of the MIMO system over the SISO system is the linear increase in spectral efficiency for MIMO systems compared to the logarithmic increase in spectral efficiency for SISO systems as $n_T$ increases.

The single-user MIMO link may be described by the equation:

$$y = Hx + n \quad (1)$$

where y is a $n_R \times 1$ receive vector, x is a $n_T \times 1$ transmit vector, n is a $n_R \times 1$ additive white Gaussian noise (AWGN) vector, and H is a $n_R \times n_T$ channel matrix. An element in the channel matrix is denoted by $h_{ij}$ and represents the complex gain of the channel between the j-th transmitter and the l-th receiver. In most situations, H may be assumed to be random and memoryless. It is also assumed that the receiver has perfect channel knowledge. The maximum channel capacity is attained when the transmitter also has perfect channel knowledge and transmits over k antennas, where k is the rank of the channel matrix.

The requirement of perfect channel knowledge cannot be met with current deployable systems. Therefore, there is a need for MIMO systems that can operate efficiently under a feedback capacity constraint.

SUMMARY

One embodiment of the present invention is directed to a MIMO system comprising: at least one mobile unit configured to transmit a signal based on a selected power matrix and a selected beam-forming matrix; and a base station configured to receive the signal from the at least one mobile unit, the base station comprising: a CSIR estimator configured to receive the signal and estimate a channel matrix for the at least one mobile device; and a CSIT generator configured to broadcast an index to the at least one mobile unit, the index corresponding to a region of a channel matrix space enclosing the estimated channel matrix of the at least one mobile unit; wherein the selected power matrix and the selected beam-forming matrix are selected based on the index broadcast by the CSIT generator.

Another embodiment of the present invention is directed to a method of optimizing the capacity of a MIMO system, the MIMO system characterized by K mobile units, each mobile unit characterized by Q levels, the K mobile units transmitting to a base station having $n_T$ antennas configured to receive a signal transmitted by the K mobile units, the method comprising: (a) generating at least one positive, semidefinite channel matrices of size $n_R \times n_T$; (b) initializing at least one power control matrix and at least one beam-forming matrix; (c) partitioning a $K \times n_R \times n_T$ channel matrix space into a set of partition regions; (d) generating at least one power control matrix and at least one beam-forming matrix based on the at least one channel matrix, the at least one power control matrix, the at least one beam-forming matrix, and the set of partition regions; (e) repeating steps c and d a preselected number, $N_g$, of times; (f) estimating a capacity of the at least one generated power control matrix, the at least one generated beam-forming matrix, and the set of partition regions; (g) repeating steps a through f a preselected number, $N_s$, of times; and (h) selecting the at least one generated power control matrix, the at least one generated beam-forming matrix, and the set of partition regions corresponding to the largest capacity.

Another embodiment of the present invention is directed to a MIMO wireless base station, comprising: at least one antenna configured to receive a signal from at least one mobile unit; a receiver configured to receive the signal from the at least one antenna; a CSIR estimator configured to estimate a channel matrix for the at least one mobile unit based in part on the signal from the at least one antenna; and a CSIT generator configured to broadcast to the at least one mobile unit a partition index corresponding to a partition containing the channel matrix of the at least one mobile unit.

BRIEF DESCRIPTION OF THE DRAWINGS

The invention will be described by reference to the preferred and alternative embodiments thereof in conjunction with the drawings in which.

DETAILED DESCRIPTION OF THE PREFERRED AND ALTERNATIVE EMBODIMENTS

Figure 1:
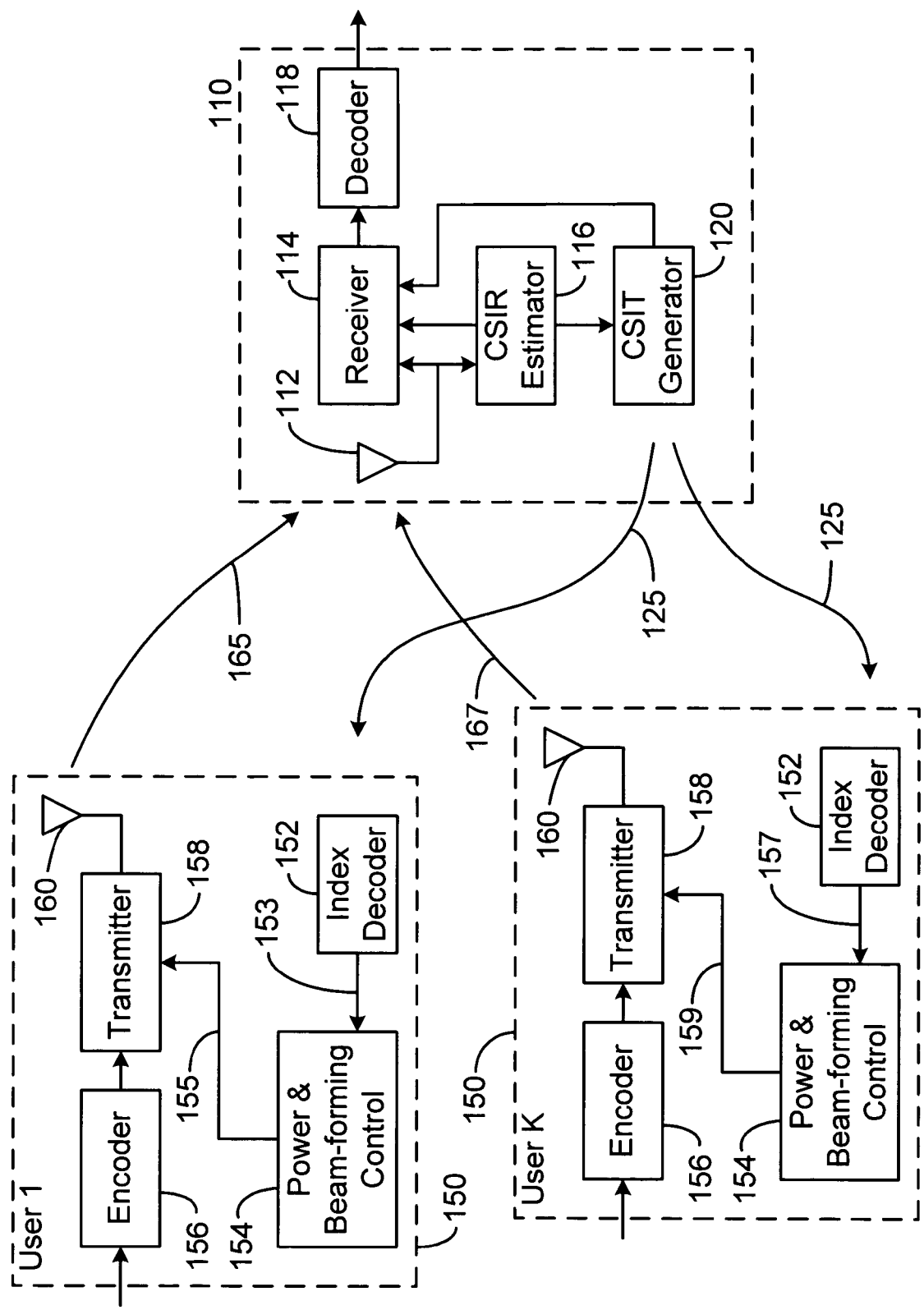
FIG. 1 is a block schematic diagram of one embodiment of the present invention.

As used hereinafter, a MIMO multi-access system includes K users and a single base station in a wireless network. A single base station is used to simplify the description of the invention and generalization to systems including more than one base station is within the scope of the present invention. FIG. 1 is a block schematic diagram of one embodiment of the present invention. For purposes of clarity, only two mobile units (users) 101 102, labeled 1 and K, respectively, are shown in FIG. 1, but it should be understood that there are K users in communication with the base station. As used hereinafter, user k refers to any one of the K users in the MIMO system.

Referring to FIG. 1, the base station 110 is equipped with $n_R$ antennas 112 and are referred hereinafter as the receive antennas although it should be understood that antennas 112 both transmit and receive signals to and from the users. The receive antennas 112 are termed receive antennas using a convention wherein the base station receives a signal transmitted by the user.

The receive antennas 112 receive the signals, Y, transmitted by the K users, indicated in FIG. 1 by 165 for user 1 and 167 for user K, and pass the signals 165 167 to the receiver 114 and the Channel State Information—Receiver (CSIR) estimator 116. The receiver 114 separates the received signal into the K user data streams based on the channel information provided by the CSIR estimator 116 and sends each user data stream to a decoder 118 where the channel symbols are decoded to reconstitute the user's data stream. The implementation and operation of the receiver 114 and decoder 118 are known to one of skill in the art and examples of such implementations may be found in Tran, T. A.; Sesay, A. B, "A generalized simplified ML decoder of orthogonal space-time block code for wireless communications over time-selective fading channels," Vehicular Technology Conference, 2002. Proceedings. VTC 2002-Fall, 2002 IEEE 56th, Volume: 3, 2002 Page(s): 1911-1915 vol. 3 and is herein incorporated by reference.

The CSIR estimator 116 estimates the channel matrices for each user and provides the channel matrices, $\{\underline{v}_1, \ldots, \underline{v}_K\}$ to the receiver 114 and Channel State Information—Transmitter (CSIT) generator 120. In one embodiment of the present invention, the CSIR for user k may be obtained by the following equation.

$$\underline{v}_k = [y_k(1) \ldots y_k(M)][x_k(1) \ldots x_k(M)]^*([x_k(1) \ldots x_k(M)][x_k(1) \ldots x_k(M)]^*)^{-1} \quad (2)$$

where $x_k(m)$ is the $n_T \times 1$ m-th transmitted pilot preamble vector of user k, $y_k(m)$ is the $n_R \times 1$ m-th received pilot symbols where $M \geq n_T$. Alternative methods for estimating $\underline{v}_k$ known to one of skill in the art are intended to be encompassed within the scope of the invention. For example, Barroso, V., Xavier, J., "*Blind identification of MIMO channels: a closed form solution based on second order statistics,*" Signals, Systems, and Computers, 1999. Conference Record of the Thirty-Third Asilomar Conference on, Volume: 1, pp 70-74, 1999 discloses alternative methods for channel state estimation and is herein incorporated by reference.

Equation 2 shows that $\underline{v}_k$ is an $n_R \times n_T$ dimension channel matrix characterizing the channel between the k-th user and the base station 110. In some embodiments of the present invention, the channel is modeled as a block-fading channel where the encoding frame and decoding frame spans across many fading blocks. The channel matrix, $\underline{v}_k$, is highly correlated within a fading block any may become less correlated between fading blocks. The channel model may be applied to model a slow mobility frequency-hopping channel.

The CSIT (Channel State Information—Transmitter) generator 120 partitions the $K \times n_R \times n_T$ dimension channel matrix into $Q^K$ regions where $Q=2^c$ is the number of quantization levels per user allowed in the system and c is the maximum number of bits allowed to feedback per user. The number of quantization levels per user represents the number of available power control and beam-forming matrices that each user may select from in response to the feedback signal received from the base station. Each partition, $R_q$, is assigned a label, q, having a value from 0 to $Q^K-1$.

The CSIT generator 120 determines the region containing the $\underline{v}_k$ estimated by the CSIR estimator 116 and assigns the corresponding partition index, q, to the user's feedback signal, $U_k$. In a preferred embodiment, the feedback signal, $U_k = q_k$ where $q_k$ is the value in the k-th position of the partition index. The set of user feedback signals 125, $(U_1, U_2, \ldots, U_K)$, is broadcast by the base unit 110 to all K users.

On the user side, the index decoder 152 receives the feedback signal 125 from the base unit 110 and extracts the user's partition index from the feedback signal 125. The user's partition index, indicated by 153 for user 1 and by 157 for user K in FIG. 1, is provided to the user's power & beam-forming control 154. The user's power & beam-forming control 154 may generate and send the power control matrix, $\rho_i(q_i)$, and the beam-forming matrix, $B_i(q_i)$, both indicated by 155 for user 1 and by 159 for user K in FIG. 1, to the transmitter 158. In some embodiments, the set of $\rho_i(q_i)$ and $B_i(q_i)$ are pre-computed and stored in the power & beam-forming control 154. The power & beam-forming control 154 retrieves and sends to the transmitter 158 the pair of $\rho_i(q_i)$ and $B_i(q_i)$ corresponding to the received partition index for the user.

In some preferred embodiments, $\rho_i(q_i)$ and $B_i(q_i)$ are pre-computed by the base station based on the number of users, K, in the base station's cell. It should be understood that not all K users transmit their payload simultaneously because some of the K users will be in an idle or waiting state that does not require transmission. Up to N users may transmit their payload simultaneously and in many situations, it is expected that $K \geq N$. If another mobile unit enters the base station's cell, the base station computes a new set of $\rho_i(q_i)$ and $B_i(q_i)$ for K+1 users and transmits the new $\rho_i(q_i)$ and $B_i(q_i)$ to each of the K+1 mobile units. The storage requirement for the transmission sets, $\rho_i(q_i)$ and $B_i(q_i)$, remains independent of K.

The user's data stream is encoded by the encoder 156 and the transmitter 158 transmits the encoded data stream over the $n_R$ antennas 160 based on the user's $\rho_i(q_i)$ and $B_i(q_i)$. The transmitted signal, indicated by 165 for user 1 and by 167 for user K in FIG. 1 is transmitted to the base station 110.

The transmission scheme of all the K mobile users are completely specified by $\{(v_1(q_1), \ldots, v_K(q_K)):q_k \in [0,Q-1]\}$, the set of $Q^K$ partitions of the channel matrix space generated at the base station, and by $\{(\rho_1(q_1), \ldots, \rho_K(q_K)):q_k \in [0,Q-1]\}$ and $\{(B_1(q_1), \ldots, B_K(q_K)):q_k \in [0,Q-1]\}$, which are the $Q^K$ sets of power control matrices and beam forming matrices, respectively, stored at each of the K mobile transmitters.

A method for generating the optimum set of parameters is now described with reference to FIG. 2, which is a flow diagram of one embodiment of the present invention. The parameters that are optimized are the $Q^K$ partitions, $R_q$, of the $K \times n_R \times n_T$ channel matrix space denoted as $\{(v_1(q_1), \ldots, v_K(q_K)):q_k \in [0,Q-1]\}$, the $Q^K$ sets of power control matrices of the K mobile users denoted as $\{(\rho_1(q_1), \ldots, \rho_K(q_K)):q_k \in [0,Q-1]\}$, and the $Q^K$ sets of beam-forming matrices denoted as $\{(B_1(q_1), \ldots, B_K(q_K)):q_k \in [0,Q-1]\}$. Although the partitions are stored at the base station and the power control and beam-forming matrices are stored at each of the K mobile users, the partitions, power control matrices, and beam-forming matrices are generated together iteratively by the method.

A partition index vector, denoted by q, may be expressed as $q=(q_1, \ldots, q_K)$ where the k-th component $q_k \in [0,Q-1]$ is the k-th digit of q expressed in base-Q. As an illustrative example, if number of quantization levels per user is 2 and the number of users is 4, then Q=2 and K=4 and a partition index of 5 may be expressed as q=5=(0,1,0,1) where $q_1=1$, $q_2=0$, $q_3=1$, and $q_4=0$.

A distance measure is defined by equation (2) below:

$$d(v_1, \ldots, v_K; \rho_1, \ldots, \rho_K; B_1, \ldots, B_K) = \qquad (3)$$

$$-\log_2 \left| I_{Kn_T} + \frac{1}{\sigma_z^2} \begin{pmatrix} v_1^* \\ \vdots \\ v_K^* \end{pmatrix} (v_1 \cdots v_K)(B_1(q_1) \cdots B_k(q_k)) \right.$$

$$\left. \begin{pmatrix} \rho_1(q_1) & 0 & 0 \\ 0 & \ddots & 0 \\ 0 & 0 & \rho_K(q_K) \end{pmatrix} \begin{pmatrix} B_1^*(q_1) \\ \vdots \\ B_K^*(q_K) \end{pmatrix} \right| + \sum_{k=1}^{K} \lambda_k \operatorname{tr}(\rho_k(q_k))$$

where $(v_1, \ldots, v_K)$ denotes the K channel matrices wherein each channel matrix is an $n_R \times n_T$ dimension matrix, $I_{Kn_T}$ is the identity matrix of size $Kn_T$, $\lambda_k$ is a system parameter related to the average power constraint of user k, and $\sigma_z$ is the channel noise power. It should be understood that the present invention is not limited by the distance measure described in equation (2) and any suitable measure apparent to one of skill in the art may be used and is within the scope of the present invention.

The distance measure is used to partition the $K \times n_R \times n_T$ space. The q-th partition region, $R_q$, is defined as the region of channel matrices nearest, in the sense of the distance measure, to $(\rho_{q_1}, \ldots, \rho_{q_K}; B_{q_1}, \ldots, B_{q_K})$ and is given by equation (3) below:

$$R_q = \begin{cases} (v_1, \ldots, v_K) \in Z^{n_R \times K n_T}: \\ d((v_1, \ldots, v_K); (\rho_1, \ldots, \rho_K)_q; (B_1, \ldots B_K)_q) < \\ d((v_1, \ldots, v_K); (\rho_1, \ldots, \rho_K)_j; (B_1, \ldots, B_K)_j) \forall j \neq q \end{cases} \qquad (4)$$

Figure 2:
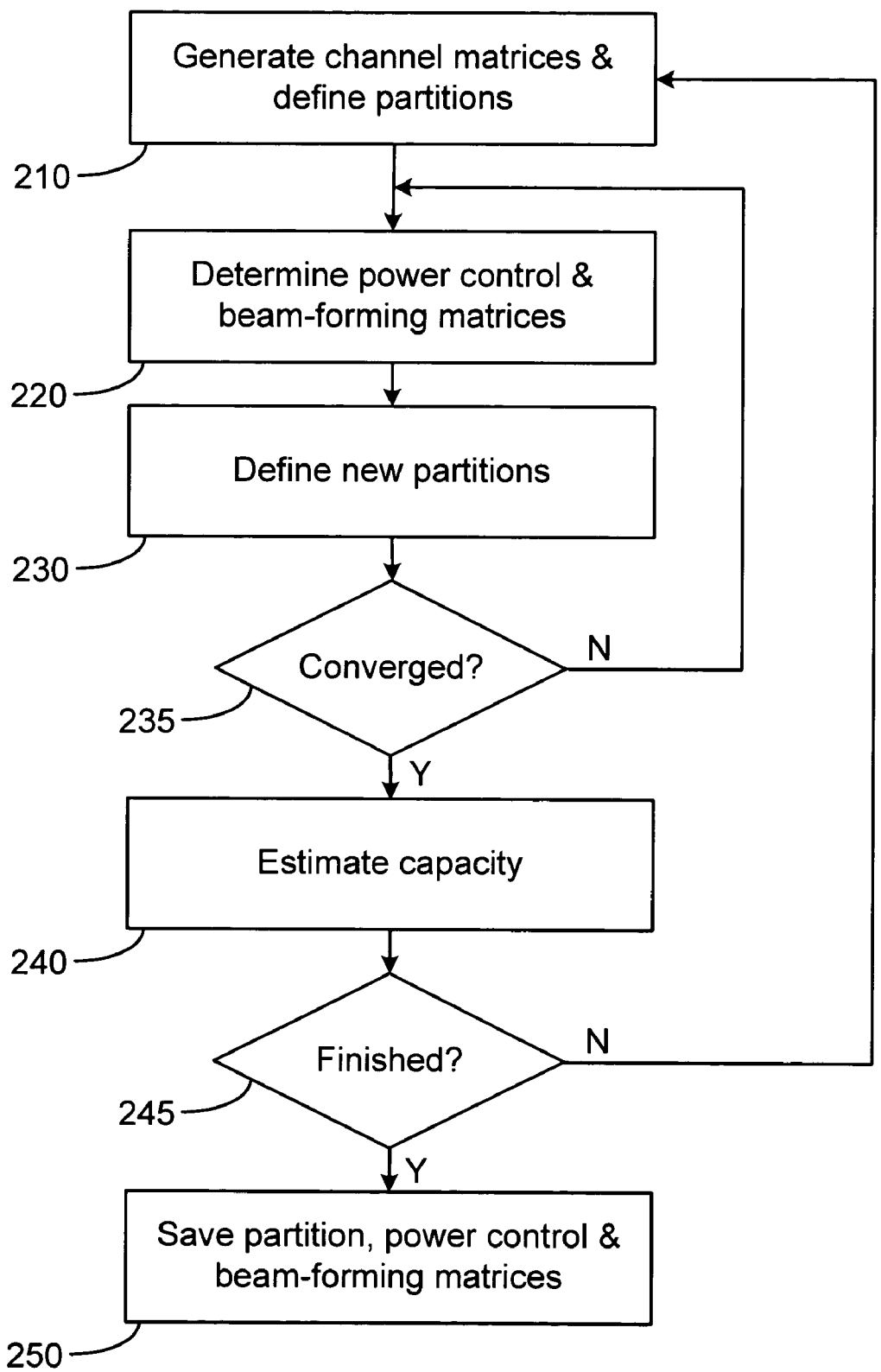
FIG. 2 is a flow diagram of another embodiment of the present invention.

Referring to FIG. 2, a set of $Q_T$ partition regions are initialized in step 210 where $Q_T = Q^K$. In step 210, a set of Q positive semidefinite matrices, denoted by $\{A(q_i), q_i \in [0, Q-1]\}$ are randomly generated in step 210. Each matrix, $A(q_i)$, is of size $n_R \times n_T$. The set of power control matrices for user k in a partition $q_i$ is denoted by $\rho_k(q_i)$ and consists of the matrices $\{\rho_k(0), \ldots, \rho_k(Q-1)\}$ wherein each $\rho_k(q_i)$ corresponds to the eigenvalue matrix of $A(q_k)$. The power control matrices are diagonal matrices of size $n_R \times n_T$ having diagonal elements equal to the $n_T$ eigenvalues of each $A(q_k)$.

The set of beam-forming matrices for partition $q_i$ for user k is denoted by $B_k(q_i)$ and comprises the set, $\{B_k(0), \ldots, B_k(Q-1)\}$. Each $B_k(q_i)$ is initialized as the hermitian matrix corresponding to the eigenmatrix of $A(q_i)$ for all $q_i = [0, Q-1]$. The eigenvalues and eigenmatrix of $A(q_i)$ may be obtained using methods known to one of skill in the art such as, for example, single value decomposition and do not require further discussion. The partitions are generated using equation (3) and the Q matrices, $A(q_i)$.

Once the partitions, $\{R_0, \ldots, R_{Q_T-1}\}$, are initialized in 210, in step 220, a new set of power control and beam-forming matrices are calculated by iteratively solving the system of equations below:

$$(\rho_q, B_q) = \operatorname*{arg\,min}_{(\rho, B)} \left[ \sum_{q \in \Omega(q_k)} E_{(v_1, \ldots, v_K) \in R_q} \right. \qquad (5)$$

$$\left. (d((v_1, \ldots, v_K); (\rho_1, \ldots, \rho_K); (B_1, \ldots, B_K))) \right]$$

The new set of power control and beam-forming matrices obtained in step 220 are used to define a new set of partitions in step 230 by applying equation (4) to the new set of power control and beam-forming matrices. Convergence of the matrices and partitions are tested in step 235. If the matrices and partitions have not converged, steps 220 and 230 are repeated before the convergence is tested again in step 235. In a preferred embodiment, steps 220 and 230 are repeated $N_g$ times where $N_g$ is a pre-selected value.

Step 240 estimates the capacity of the system with the converged power control and beam-forming matrices from step 220 and the partition regions from step 230. In a preferred embodiment, the capacity is estimated by the equation below:

$$\operatorname{Cap} = \sum_{q=0}^{Q_T-1} Pr((v_1 \ldots v_K) \in R_q) E_{(v_1, \ldots, v_K) \in R_q} [\log_2 \qquad (5)$$

$$\left| I_{Kn_T} + \frac{\begin{pmatrix} v_1^* \\ \vdots \\ v_K^* \end{pmatrix}(v_1 \ldots v_K)(B_1(q_1) \ldots B_K(q_K)) \begin{pmatrix} \rho_1(q_1) & 0 & 0 \\ 0 & \cdot & 0 \\ 0 & 0 & \rho_K(q_K) \end{pmatrix} \begin{pmatrix} B_1^*(q_1) \\ \cdot \\ B_K^*(q_K) \end{pmatrix}}{\sigma_z^2} \right|$$

Steps 210 through 240 may be repeated for different initializations of $\{A(q_i)\}$. Each initialization produces a set of power control matrices, beam-forming matrices, and partition regions along with an associated capacity. Step 245 branches to step 210 if a new initialization is desired or branches to step 250 if a sufficient number of initializations have been performed. The number of initializations may be a pre-selected value and may be determined by one of skill in the art by considering and balancing factors such as, for example, desired sample coverage and computational cost.

The set of power control matrices, beam-forming matrices and partition regions having the largest capacity is saved in step 250. In some preferred embodiments, the power control matrices and beam-forming matrices are downloaded to each mobile device.

Having described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A multiple-input, multiple-output (MIMO) system comprising:
   at least one mobile unit configured to transmit a signal based on a selected power matrix and a selected beam-forming matrix; and
   a base station configured to receive the signal from the at least one mobile unit, the base station comprising:
      a channel state information—receiver (CSIR) estimator configured to receive the signal and estimate a channel matrix for the at least one mobile device; and
      a channel state information—transmitter (CSIT) generator configured to broadcast an index to the at least one mobile unit, the index corresponding to a region of a channel matrix space enclosing the estimated channel matrix of the at least one mobile unit;
   wherein the selected power matrix and the selected beam-forming matrix are selected based on the index broadcast by the CSIT generator.

2. The MIMO system of claim 1 wherein the at least one mobile unit further comprises:
   at least one antenna configured to transmit a signal to a base station;
   a transmitter configured to transmit a signal containing an encoded data stream over the at least one antenna;
   an index decoder configured to receive a partial feedback signal and extract an index associated with the mobile unit from the partial feedback signal; and
   a power and beam-forming control configured to retrieve a power control matrix and beam-forming matrix from a set of pre-stored power control and beam-forming matrices based on the extracted index;
   wherein the transmitter generates the transmitted signal by modifying the encoded data stream with the retrieved power control matrix and beam-forming matrix.

3. The MIMO system of claim 1 wherein the selected power matrix and selected beam-forming matrix are selected from a set of transmission matrices, each member of the set comprising a power matrix and a beam-forming matrix and representing a partition of a channel matrix space of size $K \times n_R \times n_T$ where K is a number of mobile units within a cell of the base station, each mobile unit transmitting on $n_R$ antennas, the base station transmitting on $n_T$ antennas, the set of transmission matrices generated to optimize the capacity of the system.

4. The MIMO system of claim 3 wherein the set of transmission matrices is generated at the base station.

5. The MIMO system of claim 3 wherein the optimized set of transmission matrices is generated by a method comprising:
   a. generating at least one positive, semidefinite channel matrices of size $n_R \times n_T$;
   b. initializing at least one power control matrix and at least one beam-forming matrix;
   c. partitioning a $K \times n_R \times n_T$ channel matrix space into a set of partition regions;
   d. generating at least one power control matrix and at least one beam-forming matrix based on the at least one channel matrix, the at least one power control matrix, the at least one beam-forming matrix, and the set of partition regions;
   e. repeating steps c and d a preselected number, $N_g$, of times;
   f. estimating a capacity of the at least one generated power control matrix, the at least one generated beam-forming matrix, and the set of partition regions;
   g. repeating steps a through f a preselected number, $N_s$, of times; and
   h. selecting the at least one generated power control matrix, the at least one generated beam-forming matrix, and the set of partition regions corresponding to the largest capacity.

6. The method of claim 5 wherein the at least one power control matrix is a diagonal matrix having a diagonal element equal to an eigenvalue of the at least one channel matrix.

7. The method of claim 5 wherein the at least one beam-forming matrix is hermitian matrix corresponding to an eigenmatrix of the at least one channel matrix.

8. The method of claim 5 wherein the channel matrix space is partitioned such that every channel matrix within the partition is closest to the same at least one generated power control matrix and the at least one generated beam-forming matrix.

9. A method of optimizing the capacity of a MIMO system, the MIMO system characterized by K mobile units, each mobile unit characterized by Q levels, the K mobile units transmitting to a base station having $n_T$ antennas configured to receive a signal transmitted by the K mobile units, the method comprising:
   i. generating at least one positive, semidefinite channel matrices of size $n_R \times n_T$;
   j. initializing at least one power control matrix and at least one beam-forming matrix;
   k. partitioning a $K \times n_R \times n_T$ channel matrix space into a set of partition regions;
   l. generating at least one power control matrix and at least one beam-forming matrix based on the at least one channel matrix, the at least one power control matrix, the at least one beam-forming matrix, and the set of partition regions;
   m. repeating steps c and d a preselected number, $N_g$, of times;
   n. estimating a capacity of the at least one generated power control matrix, the at least one generated beam-forming matrix, and the set of partition regions;
   o. repeating steps a through f a preselected number, $N_s$, of times; and
   p. selecting the at least one generated power control matrix, the at least one generated beam-forming matrix, and the set of partition regions corresponding to the largest capacity.

10. The method of claim 9 wherein the at least one power control matrix is a diagonal matrix having a diagonal element equal to an eigenvalue of the at least one channel matrix.

11. The method of claim 9 wherein the at least one beam-forming matrix is hermitian matrix corresponding to an eigenmatrix of the at least one channel matrix.

12. The method of claim 9 wherein the partition index is a K component vector, each component of the vector representing a level of the at least one mobile unit.

13. The method of claim 12 wherein the component is expressed in base-Q.

14. The method of claim 9 wherein the channel matrix space is partitioned such that every channel matrix within the partition is closest to the same at least one generated power control matrix and the at least one generated beam-forming matrix.

15. The method of claim 9 further comprising storing the selected at least one power control matrix and the at least one beam-forming matrix in each of the K mobile units.

16. The method of claim 9 further comprising storing the set of partition regions in the base station.

17. A MIMO wireless base station comprising:
at least one antenna configured to receive a signal from at least one mobile unit;
a receiver configured to receive the signal from the at least one antenna;
a CSIR estimator configured to estimate a channel matrix for the at least one mobile unit based in part on the signal from the at least one antenna; and
a CSIT generator configured to broadcast to the at least one mobile unit a partition index corresponding to a partition containing the channel matrix of the at least one mobile unit.

18. A MIMO wireless mobile unit comprising:
at least one antenna configured to transmit a signal to a base station;
a transmitter configured to transmit a signal containing an encoded data stream over the at least one antenna;
an index decoder configured to receive a partial feedback signal and extract an index associated with the mobile unit from the partial feedback signal; and
a power and beam-forming control configured to retrieve a power control matrix and beam-forming matrix from a set of pre-stored power control and beam-forming matrices based on the extracted index;
wherein the transmitter generates the transmitted signal by modifying the encoded data stream with the retrieved power control matrix and beam-forming matrix.

19. A method for optimizing the capacity of a MIMO wireless system with partial feedback, the system characterized by K mobile units having Q levels, each mobile unit characterized by a channel matrix, the channel matrix embedded in a $K \times n_R \times n_T$ dimension channel matrix space, the method comprising:

(a) partitioning the matrix space into $Q^K$ regions, $\{R_q\}$;

(b) determining an optimal set of $Q^K$ power control matrices, $\{\rho_q\}$, and an optimal set of $Q^K$ bream-forming matrices, $\{B_q\}$ based on $\{R_q\}$;

(c) estimating a capacity of the MIMO system based on $\{R_q\}$, $\{\rho_q\}$, and $\{B_q\}$;

repeating steps (a) through (c) a predetermined number of times; and selecting a set of $\{R_q\}$, $\{\rho_q\}$, and $\{B_q\}$ having the largest estimated capacity.

* * * * *